United States Patent
Waltermann et al.

(10) Patent No.: US 10,013,540 B2
(45) Date of Patent: Jul. 3, 2018

(54) AUTHENTICATION BASED ON BODY MOVEMENT

(71) Applicant: LENOVO (SINGAPORE) PTE. LTD., New Tech Park (SG)

(72) Inventors: Rod David Waltermann, Rougemont, NC (US); Russell Speight VanBlon, Raleigh, NC (US); Nathan J. Peterson, Durham, NC (US); Arnold S. Weksler, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 266 days.

(21) Appl. No.: 14/643,132

(22) Filed: Mar. 10, 2015

(65) Prior Publication Data
US 2016/0267265 A1 Sep. 15, 2016

(51) Int. Cl.
*G06F 21/32* (2013.01)
*G06F 3/01* (2006.01)

(52) U.S. Cl.
CPC .............. *G06F 21/32* (2013.01); *G06F 3/017* (2013.01)

(58) Field of Classification Search
CPC . H04L 63/0861; H04L 63/0884; G06F 21/31; G06F 21/32; G06F 21/35; G06F 21/36
USPC ........................................ 726/7, 19; 713/161
See application file for complete search history.

(56) References Cited

U.S. PATENT DOCUMENTS

| | | | |
|---|---|---|---|
| 2,510,344 A | 6/1950 | Law | |
| 2,567,654 A | 9/1951 | Siezen | |
| 3,418,426 A | 12/1968 | Schlegel et al. | |
| 3,628,854 A | 12/1971 | Jampolsky | |
| 4,082,433 A | 4/1978 | Appeldorn et al. | |
| 4,190,330 A | 2/1980 | Berreman | |
| 4,577,928 A | 3/1986 | Brown | |
| 5,579,037 A | 11/1996 | Tahara et al. | |
| 5,583,702 A | 12/1996 | Cintra | |
| 6,046,847 A | 4/2000 | Takahashi | |
| 8,316,436 B2 * | 11/2012 | Shirai | G06F 21/31 726/19 |

(Continued)

FOREIGN PATENT DOCUMENTS

| | | |
|---|---|---|
| DE | 10310794 | 9/2004 |
| DE | 69937592 | 10/2008 |

(Continued)

OTHER PUBLICATIONS

Nathan J. Peterson, Arnold S. Weksler, John Carl Mese, Russell Speight VanBlon, "Determination of Device with Which to Establish Communication Based on Biometric Input", file history of related U.S. Appl. No. 14/962,002, filed Dec. 8, 2015.

(Continued)

*Primary Examiner* — Eleni Shiferaw
*Assistant Examiner* — Hee Song
(74) *Attorney, Agent, or Firm* — John L. Rogitz; John M. Rogitz

(57) ABSTRACT

In one aspect, a device includes a processor and memory accessible to the processor. The memory bears instructions executable by the processor to receive input from at least one electromyograph, and based at least in part on the input, determine whether a user is authorized to manipulate the device to execute at least one function.

20 Claims, 6 Drawing Sheets

(56) References Cited

U.S. PATENT DOCUMENTS

| | | | |
|---|---|---|---|
| 8,499,164 B2 | 7/2013 | Ortiz et al. | |
| 8,781,791 B2 | 7/2014 | Panther et al. | |
| 9,232,402 B2 | 1/2016 | Horton | |
| 9,646,146 B2 | 5/2017 | LaCous et al. | |
| 2004/0160419 A1 | 8/2004 | Padgitt | |
| 2005/0114654 A1* | 5/2005 | Brackett | G06F 21/35 713/161 |
| 2009/0065578 A1 | 3/2009 | Peterson et al. | |
| 2009/0133106 A1* | 5/2009 | Bentley | G06F 21/31 726/5 |
| 2009/0204410 A1 | 8/2009 | Mozer et al. | |
| 2009/0259349 A1 | 10/2009 | Golenski | |
| 2009/0315740 A1 | 12/2009 | Hildreth et al. | |
| 2010/0079508 A1 | 4/2010 | Hodge et al. | |
| 2010/0171720 A1 | 7/2010 | Craig et al. | |
| 2010/0211918 A1 | 8/2010 | Liang et al. | |
| 2011/0065451 A1 | 3/2011 | Danado et al. | |
| 2012/0149309 A1 | 6/2012 | Hubner et al. | |
| 2012/0220311 A1 | 8/2012 | Rodriguez et al. | |
| 2012/0268268 A1 | 10/2012 | Bargero | |
| 2013/0021459 A1 | 1/2013 | Vasilieff et al. | |
| 2013/0044042 A1 | 2/2013 | Olsson et al. | |
| 2013/0170755 A1 | 7/2013 | Dalton et al. | |
| 2013/0246663 A1 | 9/2013 | Raveendran et al. | |
| 2013/0307771 A1 | 11/2013 | Parker et al. | |
| 2014/0142403 A1* | 5/2014 | Brumback | A61B 5/02433 600/324 |
| 2014/0165185 A1* | 6/2014 | Lange | G06K 9/00892 726/19 |
| 2014/0317524 A1 | 10/2014 | VanBlon et al. | |
| 2014/0354529 A1* | 12/2014 | Laughlin | G06F 3/011 345/156 |
| 2014/0366111 A1* | 12/2014 | Sheller | H04L 63/08 726/7 |
| 2015/0149375 A1* | 5/2015 | Thompson | G06Q 50/01 705/319 |
| 2015/0168996 A1* | 6/2015 | Sharpe | G06F 21/316 700/73 |
| 2015/0169858 A1* | 6/2015 | Tg | G06F 21/32 726/18 |
| 2015/0235098 A1* | 8/2015 | Lee | G06K 9/00912 715/709 |
| 2015/0269936 A1* | 9/2015 | Alameh | G10L 15/26 704/235 |
| 2015/0341349 A1* | 11/2015 | Mandal | H04L 63/0861 726/7 |
| 2015/0341350 A1* | 11/2015 | Mandal | H04L 63/0861 726/6 |
| 2015/0350200 A1* | 12/2015 | Li | H04L 63/0861 726/8 |
| 2016/0078771 A1* | 3/2016 | Zhuang | G09B 5/00 434/236 |
| 2016/0149881 A1* | 5/2016 | Rengan | H04L 63/107 726/7 |
| 2016/0366188 A1 | 12/2016 | Smith et al. | |

FOREIGN PATENT DOCUMENTS

| | | |
|---|---|---|
| EP | 0880090 | 11/1998 |
| WO | 2004051392 | 6/2004 |

OTHER PUBLICATIONS

Russell Speight VanBlon, Neal Robert Caliendo Jr.; "Automatic Magnification and Selection Confirmation" file history of related U.S. Appl. No. 14/322,119, filed Jul. 2, 2014.

Russell Speight VanBlon, Neal Robert Caliendo Jr.; "Magnification Based on Eye Input" file history of related U.S. Appl. No. 14/546,962, filed Nov. 18, 2014.

Russell Speight VanBlon, Suzanne Marion Beaumont, Rod David Waltermann, "Detecting Pause in Audible Input to Device" file history of related U.S. Appl. No. 14/095,369, filed Dec. 3, 2013.

Suzanne Marion Beaumont, Russell Speight VanBlon, Rod D. Waltermann, "Devices and Methods to Receive Input at a First Device and Present Output in Response on a Second Device Different from the First Device" file history of related U.S. Appl. No. 14/095,093, filed Dec. 3, 2013.

Jonathan Gaither Knox, Rod D. Waltermann, Liang Chen, Mark Evan Cohen, "Initiating Personal Assistant Application Based on Eye Tracking and Gestures" file history of related U.S. Appl. No. 14/095,235, filed Dec. 3, 2013.

Nathan J. Peterson, John Carl Mese, Russell Speight VanBlon, Arnold S. Weksler, Rod D. Waltermann, Xin Feng, Howard J. Locker, "Systems and Methods to Present Information on Device Based on Eye Tracking" file history of related U.S. Appl. No. 14/132,663, filed Dec. 18, 2013.

Russell Speight VanBlon, Rod David Waltermann, John Carl Mese, Arnold S. Weksler, Nathan J. Peterson, "Detecting Noise or Object Interruption in Audio Video Viewing and Altering Presentation Based Thereon" file history of related U.S. Appl. No. 14/158,990, filed Jan. 20, 2014.

Russell Speight VanBlon, Axel Ramirez Flores, Jennifer Greenwood Zawacki, Alan Ladd Painter, "Skin Mounted Input Device" file history of related U.S. Appl. No. 14/162,115, filed Jan. 23, 2014.

Axel Ramirez Flores, Rod David Waltermann, James Anthony Hunt, Bruce Douglas Gress, James Alan Lacroix, "Glasses with Fluid-Fillable Membrane for Adjusting Focal Length of One or More Lenses of the Glasses" file history of related U.S. Appl. No. 14/453,024, filed Aug. 6, 2014.

Steven Richard Perrin, Jianbang Zhang, John Weldon, Scott Edwards Kelso, "Initiating Application and Performing Function Based on Input" file history of related U.S. Appl. No. 14/557,628, filed Dec. 2, 2014.

Rod David Waltermann, John Carl Mese, Nathan J. Peterson, Arnold S. Weksler, Russell Speight VanBlon, "Movement of Displayed Element from One Display to Another" file history of related U.S. Appl. No. 14/550,107, filed Nov. 21, 2014.

Amy Leigh Rose, Nathan J. Peterson, John Scott Crowe, Bryan Loyd Young, Jennifer Lee-Baron, "Presentation of Data on an at Least Partially Transparent Display Based on User Focus" file history of related U.S. Appl. No. 14/548,938, filed Nov. 20, 2014.

Grigori Zaitsev, Russell Speight VanBlon, "Projective of Images on Side Window of Vehicle" file history of related U.S. Appl. No. 14/639,263, filed Mar. 5, 2015.

Tactus Technology, "Taking Touch Screen Interfaces Into a New Dimension", 2012 (13 pages).

Arthur Davis, Frank Kuhnlenz, "Optical Design Using Fresnel Lenses, Basic Principles and some Practical Examples" Optik & Photonik, Dec. 2007.

Superfocus, "See the World in Superfocus Revolutionary Eyeglasses Give You the Power to Focus Your Entire View At Any Distance", http://superfocus.com/eye-care-practitioners, printed from website Jun. 24, 2014.

Darren Quick, "PixelOptics to Launch 'world's first electronic focusing eyewear'", http://www.gizmag.com/pixeloptics-empower-electroni-focusing-glasses/17569/. Jan. 12, 2011.

Insight News, "Electronic-lens company PixelOptics is bankrupt", htttp://www.insightnews.com.au/_blog/NEWS_NOW!/post/lens/electronic-lens-company-pixeloptics-is-bankrupt/. Dec. 12, 2013.

Wikipedia, "Extended Display Identification Data", Definition; http://en.wikipedia.org/wiki/Extended_display_Identification_data, printed from website Oct. 10, 2014.

Extron , "Digital Connection, Understanding EDID—Extended Display Identification Data", Fall 2009, www.extron.com.

"Relationship Between Inches, Picas, Points, Pitch, and Twips", Article ID: 76388; http://support2.microsoft.com/KB/76388. Printed Oct. 10, 2014.

Wikipedia, "Polarizer" Definition; http://en.wikipedia.org/wiki/Polarizer, printed from website Jan. 14, 2015.

Wikepedia, "Smart Glass" Definition, http://en.wikipedia.org/wiki/Smart_glass, printed from website Jan. 14, 2015.

Wikipedia, "Microphone array", definition, http://en.wikipedia.org/wiki/Microphone_array, printed from website Jan. 22, 2015.

Wikipedia, "Beamforning", definition; http://en.wikipedia.org/wiki/Beamforming, printed from website Jan. 22, 2015.

(56) References Cited

OTHER PUBLICATIONS

"Understanding & Using Directional Microphones", http://www.soundonsound.com/sos/sep00/articles/direction.htm; Published in SOS Sep. 2000.
Wikipedia, "Microphone", definition; http://en.wilipedia.org/wkik/microphone, printed from website Jan. 22, 2015.
ThalmicLabs, "Myo-Tech Specs", http://www.thalmic.com/en/myo/techspecs, printed from website Jan. 27, 2015.
ThalmicLabs, "Myo Gesture Control Armband" http://www.thalmic.com/en/myo, printed from website Jan. 27, 2015.
Wikipedia, "Electromyography", definition; http://en.wikipedia.org/wiki/Electromyogrpahy, printed from website Jan. 27, 2015.
iSource: "Raise to Speak Makes Siri Wonderfully Useful (Once You Know How to Use It)", http:///isource.com/10/01/raise-to-speak-makes-siri-wonderfully-useful-once-you-know-how-to-use-it./ Web printout Nov. 15, 2013.
Scott Wentao Li, Russell Speight VanBlon, Liang Chen, "Presentation of Audio Based on Source" file history of related U.S. Appl. No. 14/661,143, filed Mar. 18, 2015.
Amy Leigh Rose, Nathan J. Peterson, John Scott Crowe, Bryan Loyd Young, "Prevention of Light from Exterior to a Device Having a Camera from Being Used to Generate an Image Using the Camera Based on the Distance of a User to the Device" file history of related U.S. Appl. No. 14/659,803, filed Mar. 17, 2015.
Russell Speight VanBlon, Jianbang Zhang, John Weldon Nicholson, "Execution of Function Based on Location of Display at Which a User is Looking and Manipulation of an Input Device" file history of related U.S. Appl. No. 14/643,505, filed Mar. 10, 2015.
David W. Douglas, Joseph David Plunkett, "Camera That Uses Light from Plural Light Sources Disposed on a Device" file history of related U.S. Appl. No. 14/670,753, filed Mar. 27, 2015.
Livescribe:: Never Miss a Word. Website printout Jan. 20, 2015, http://www.livescribe.com/en-us/.
Livescribe:: Never Miss a Word, What is a Pencast? Website printout Jan. 20, 2015, http://www.livescribe.com/en-us-pencasts/.
Vibewrite Lernstift 'Jules Verne Edition', website printout Jan. 20, 2015, http://vibewrite.com/shop/index.php?route=product/product&path=59&product_id=52.
Nathan J. Peterson, Arnold S. Weksler, John Carl Mese, Russell Speight VanBlon, "Determination of Device with Which to Establish Communication Based on Biometric Input", related U.S. Appl. No. 14/962,002, Non-Final Office Action dated Nov. 16, 2017.

* cited by examiner

| Electromyography ID | Person | Permissions |
|---|---|---|
| X | Jim | All |
| Y | Fred | Internet and word processing only |
| Z | Steve | All |

AUTHENTICATION BASED ON BODY MOVEMENT

I. FIELD

The present application relates generally to authentication based on body movement.

II. BACKGROUND

When a user logs in to a computer using a keyboard, it is possible for another person nearby to see the user's actions at the keyboard and thus gain unauthorized access to the user's login credentials (such as the user's password), and hence gain unauthorized access to the user's computer. As recognized herein, such unauthorized access is problematic for a number of reasons, including that users often store personal information on their computers that may become compromised.

SUMMARY

Accordingly, in one aspect a device includes a processor and memory accessible to the processor. The memory bears instructions executable by the processor to receive input from at least one electromyograph, and based at least in part on the input, determine whether a user is authorized to manipulate the device to execute at least one function.

In another aspect, a method, includes, based on input from a body sensor, identifying a particular person. The method also includes, in response to identifying the particular person, authenticating the particular person.

In still another aspect, an apparatus includes a first processor, a network adapter, and storage bearing instructions executable by a second processor for receiving input from a sensor comprising at least one electrode and, based on the input, identifying a person as being authorized to control a device to perform at least one operation. The first processor transfers the instructions over a network via the network adapter.

The details of present principles, both as to their structure and operation, can best be understood in reference to the accompanying drawings, in which like reference numerals refer to like parts, and in which:

DETAILED DESCRIPTION

Figure 1:
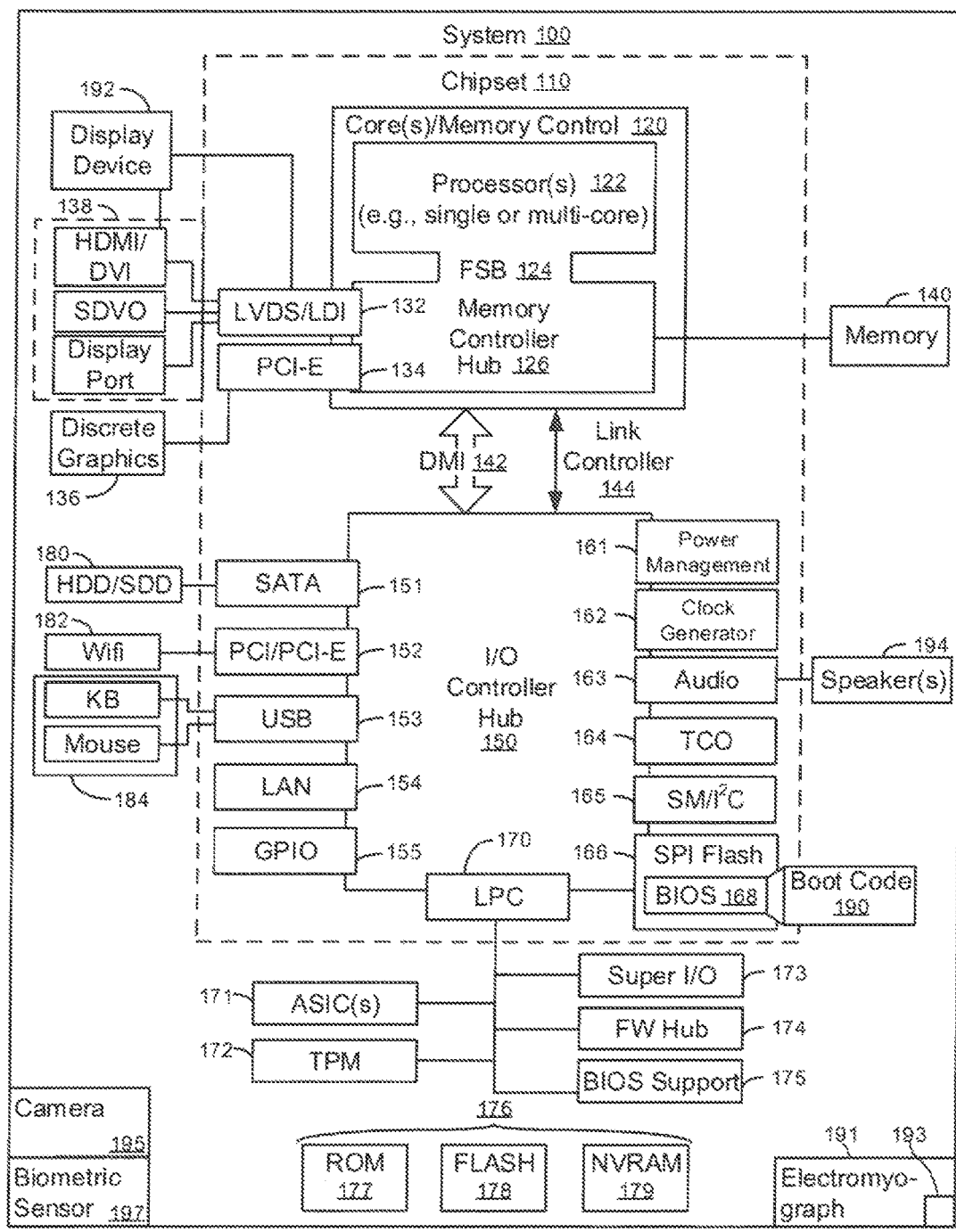
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local internet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interlace 132 (e.g., serial digital video, HDMI/DVI display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E post for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 includes at least one electromyograph 191 comprising at least one electrode 193, the electromyograph being configured for, when at least the electrode 193 is in (e.g. physical, mechanical, and/or electrical) contact with a person, sensing electrical activity and/or electrical signals (and/or signal patterns) generated by movement of the person's muscles. The electromyograph is also configured to provide input related thereto to the processor 122. In addition to or in lieu of the sensor 191 being an electromyography, it may be e.g. another body sensor for sensing movement of a person's muscles (and/or ligaments, and/or tendons) and generating input in accordance with present principles.

Still further, the system 100 may include at least camera 195 for gathering one or more images (e.g. of a user's eyes) and providing input related thereto to the processor 122. The camera may be, e.g., a thermal imaging camera, a digital camera such as a webcam, a three-dimensional (3D) camera, and/or a camera integrated into the system 100 and controllable by the processor 122 to gather pictures, images, and/or video as well as to perform eye tracking at the system 100. The system 100 may also include at least one biometric sensor 197 such as e.g. a fingerprint reader, a retina and/or iris reader, a heart rate sensor, a pulse sensor, a blood pressure sensor, a perspiration sensor, an odor and/or scent sensor, a body temperature sensor, a lung input/output sensor, etc.

Still in reference to FIG. 1, and though now shown for clarity, in some embodiments the system 100 may include a gyroscope for e.g. sensing and/or measuring the orientation of the system 100 and providing input related thereto to the processor 122, an accelerometer for e.g. sensing acceleration and/or movement of the system 100 and providing input related thereto to the processor 122, and an audio receiver/microphone providing input to the processor 122 e.g. based on a user providing audible input to the microphone. Still further, and also not shown for clarity, the system 100 may include a GPS transceiver that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
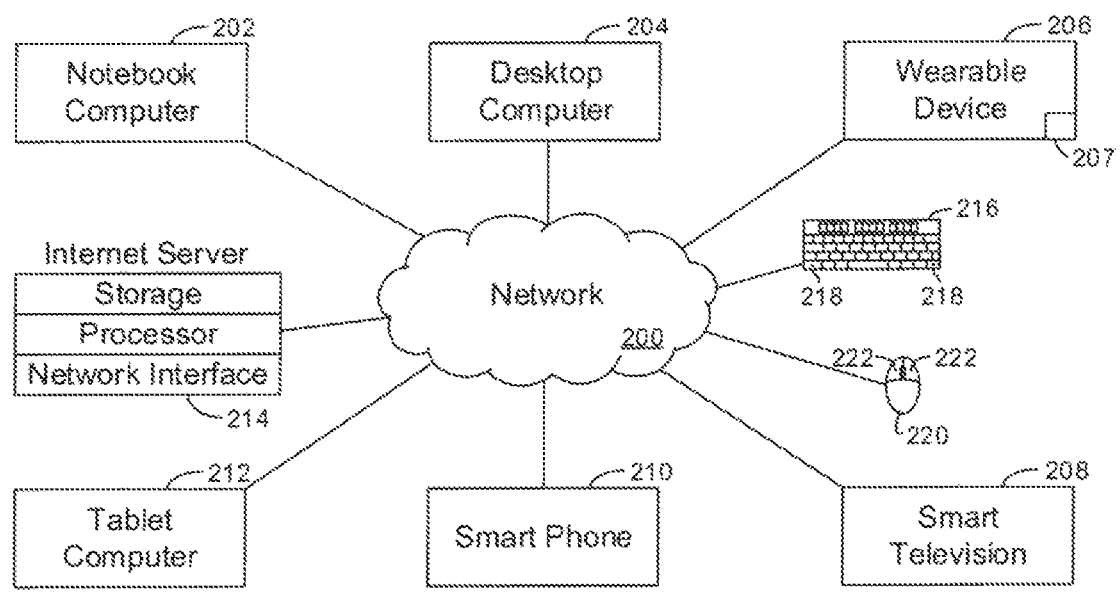
FIG. 2 is a block diagram of a network of devices in accordance with present principles.

Also, before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 (e.g. such as e.g. a smart watch, arm band, finger band, etc. comprising an electromyograph 207 comprising at least one electrode for sensing muscle movement in accordance with present principles), a smart television (TV) 208, a smart phone 210, a tablet computer 212, a server 214, a keyboard 216 comprising at least one electrode 218 disposed on at least one key for sensing muscle movement in accordance with present principles (e.g. the keyboard 216 may include an electromyograph), and a mouse 220 comprising at least one electrode 222 disposed on at least one key for sensing muscle movement in accordance with present principles (e.g. the mouse 220 may include an electromyograph). The server 214 may be e.g. an Internet server that may e.g. provide cloud storage accessible to the devices 202-212, 216, and 220. It is to be understood that the devices shown in FIG. 2 are configured to communicate with each other over the network 200 to undertake present principles.

Figure 3:
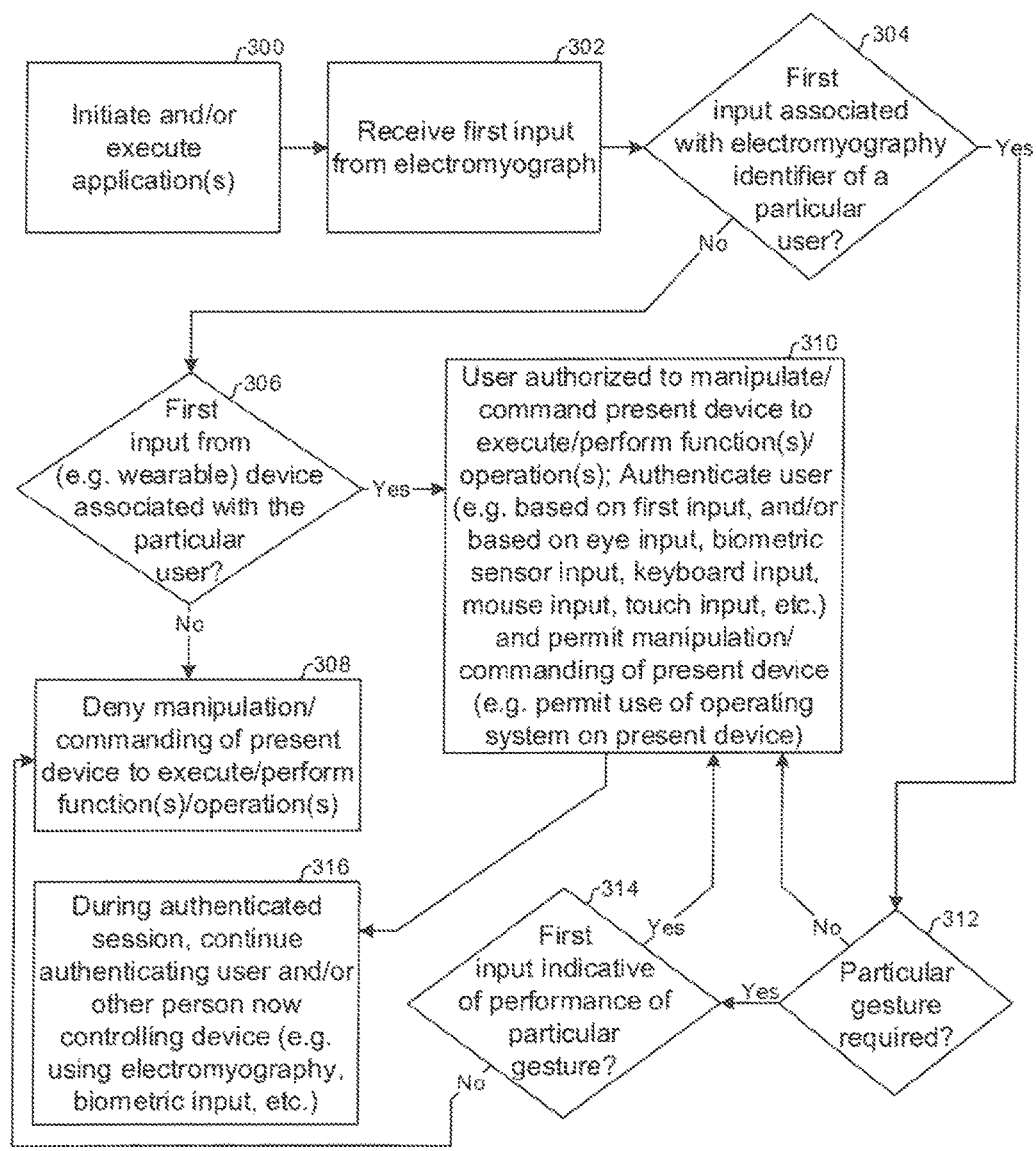
FIG. 3 is a flow chart showing an example algorithm in accordance with present principles.

Referring to FIG. 3, it shows example logic that may be undertaken by a device such as the system 100 in accordance with present principles (referred to below as the "present device"). Beginning at block 300, the logic initiates and/or executes one or more applications for undertaking present, principles, such as e.g. an electromyograph input and/or input identification application, an electromyography (EMG) application, a biometric input and/or input identification application, an eye tracking application, a keyboard and/or mouse input application, a touch-based input application, an authentication and/or computer access application, a single application integrating one or more of the foregoing, etc.

From block 300 the logic then moves to block 302, where the logic receives first input from an electromyograph (e.g. on a wearable device and/or a keyboard) sensing electrical signals, signal patterns, and/or activity of a person using at least one electrode on the electromyograph which is in electrical communication with the person (e.g. in at least partial skin contact with the person to sense electrical signals generated by the person based on the person's muscle movement). After block 302 the logic proceeds to decision diamond 304, where the logic determines whether the first input is associated with an EMG identifier for a particular user (e.g. of the present device). Thus, before proceeding, it is to be understood that different people, when they move their respective bodies, emit electrical signals and/or electrical signal patterns from their muscles that are different (e.g. in frequency) from the signals emitted by other people and that these electrical signals can therefore be distinguishable and/or at least relatively unique for each person.

Accordingly, at diamond 304 the logic determines whether the first input from the electromyograph pertains to electrical signals of a recognized user and/or a user for which EMG information (e.g. the identifier) has already been stored. In some embodiments, each person may have an EMG identifier generated (and stored at the present device or another location accessible to the present device) e.g. during an initial authentication calibration of the device based on their electrical signals, or otherwise provide input for their EMG identifier to be accessible to the present device, so that upon subsequent receipt at the present device of input from an electromyograph sensing muscle movement of that particular user, the user may be authenticated based on their unique electrical signals.

However, first note that a negative determination at diamond 304 causes the logic to proceed to decision diamond 306, where the logic determines whether the first input that was received at block 302 was received from a particular device associated with the particular user (e.g. based on metadata and/or a network address identifying the particular user device that was received with the first input, and a comparison of that metadata and/or network address to data accessible at the present device identifying the particular user device and/or matching the metadata and/or network address). Thus, if e.g. electrical signals were not sensed properly at the particular user device for some reason, if the first input was not recognized at the present device for some reason (e.g. an error in wireless communication of the first input to the present device), etc., the present device may nonetheless still identify the user in some embodiments based at least on identification of the particular user device itself and/or a gesture made by the user as nonetheless sensed by the particular user device and communicated to the present device. Accordingly, present principles recognize that it may in some embodiments be desirable to use input from a wearable device generated based on a particular gesture and/or sequence of gestures as input to authenticate the user, regardless of identifying the particular user that performed the gesture input.

In any case, responsive to a negative determination at diamond 306, the logic moves to block 308 where the logic denies permission to manipulate and/or command the present device to execute and/or perform one or more functions and/or operations. However, an affirmative determination at diamond 306 causes the logic to move to block 310, where the logic determines that the particular user is authorized to manipulate and/or command the present device to execute and/or perform one or more functions and/or operations. Thus, also at block 310, the logic authenticates the particular user e.g. based at least on the first input. Furthermore, in embodiments where additional authentication methods are needed to be conformed with in addition to authentication based on recognition of electrical signals from a particular user, at block 310 the logic may authenticate based on other input received at the present device, such as e.g. based on eye input (e.g. as determined by applying eye tracking software to one or more images of a user's eyes gathered by a camera to identify e.g. a sequence of eye movements establishing an eye input password, and/or to otherwise identify the particular user based on iris and/or retina identification), based on input from one or more biometric sensors sensing respective biometrics (e.g., fingerprint, heart rate, blood pressure, lung output) of the particular user to identify unique biometric output for the particular user, based on keyboard, mouse, and/or touch-based entry of a password, based on touch-based input, etc. In any case, upon authentication at block 310, the logic permits manipulation and/or commanding of the present device to execute and/or perform one or more functions and/or operations (e.g. permits the particular user to use an operating system running on the present device to perform one or more tasks).

Still in reference to FIG. 3 but referring back to decision diamond 304, note that if instead of the logic making a negative determination thereat as described above, an affirmative determination is made, the logic moves to decision diamond 312. At diamond 312 the logic determines whether a particular gesture (e.g. as sensed by the particular user device) is needed for authentication in addition to mere identification of the first input as being associated with the particular user (e.g. if settings have been configured at the present device for the user to provide such a gesture). A negative determination at diamond 312 causes the logic to proceed directly to block 310 and proceed therefrom as described above, it being also noted that when proceeding from diamond 312, at block 310 the logic determines that the user is authorized, authenticates the user, and/or permits manipulation of the present device as described above based on the present device e.g. identifying the first input as pertaining to the particular user's muscle-generated electrical signals and/or based on the EMG identifier identified by the present device based on the first input.

However, if at diamond 312 the logic instead determines that a particular gesture is needed, the logic proceeds to decision diamond 314 from diamond 312. At diamond 314, the logic determines whether the first input and/or additional input received from the particular user device is indicative of performance of a particular gesture for which permission to control the present device may be granted. A negative determination at diamond 314 causes the logic to proceed to block 308 and take action thereat as described above. An affirmative determination at diamond 314 causes the logic to move to block 310 and take action thereat as described above.

Before moving on to the description of other figures, it is to also be understood in reference to FIG. 3 that in some embodiments, after block 310 the logic may proceed to block 316. At block 316 the logic may (e.g. if the present device has been configured accordingly) during the session for which the user was authenticated at block 310 (e.g. a single and/or one-time login session, and/or one operating system session), continue authenticating the user and/or another person who may be controlling the present device using e.g. additional input pertaining to EMG from which a particular user may be identified, biometric input from which a particular user may be identified, a password from which a particular user may be identified, etc. The additional input may be received from e.g. the particular user's device (e.g. a wearable device), and/or received from another device such as keyboards and mice providing input to the present device which have electromyography and/or biometric sensors thereon (e.g. such as the keyboard 216 with sensors 218 described above). Accordingly, at block 316 the logic may continue to verify that the user initially authorized and/or another authorized user is using the present device, rather than e.g. an unauthorized user who has begun controlling the present device during the active session after the authorized user e.g. walked away from the present device.

Figure 4:
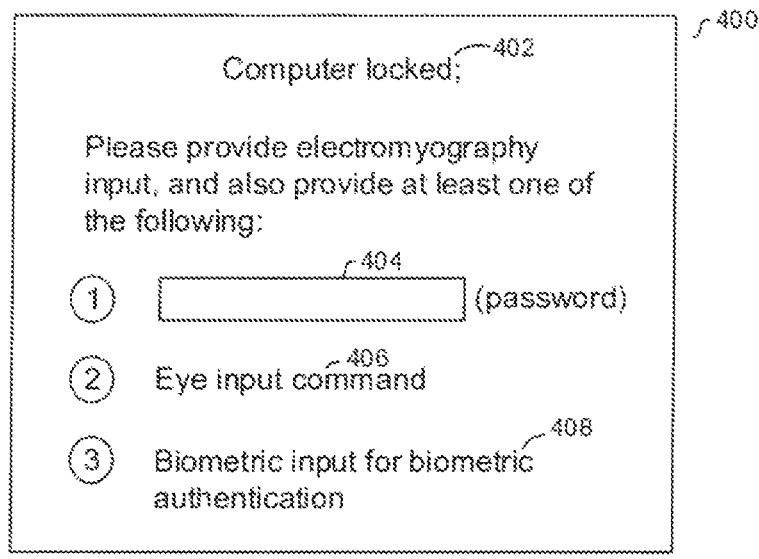
FIGS. 4-8 are example user interfaces (UIs) in accordance with present principles.

Continuing the detailed description in reference to FIG. 4, it shows an example user interface (UI) 400 that may be presented on the display of a device such as the system 100 and/or the device undertaking the logic of FIG. 3 prior to an authentication and/or grant of access to the device in accordance with present principles. Thus, the UI 400 includes a prompt 402 indicating that the device is locked and also requesting EMG input. Furthermore, in some embodiments the prompt 402 may include a request for additional input for authentication. Thus, an input area 404 is shown for entry of a password. An option 406 is also shown indicating that an eye input command may be provided as the additional input, as well as an option 408 indicating that biometric input may be provided as the additional input.

Figure 5:
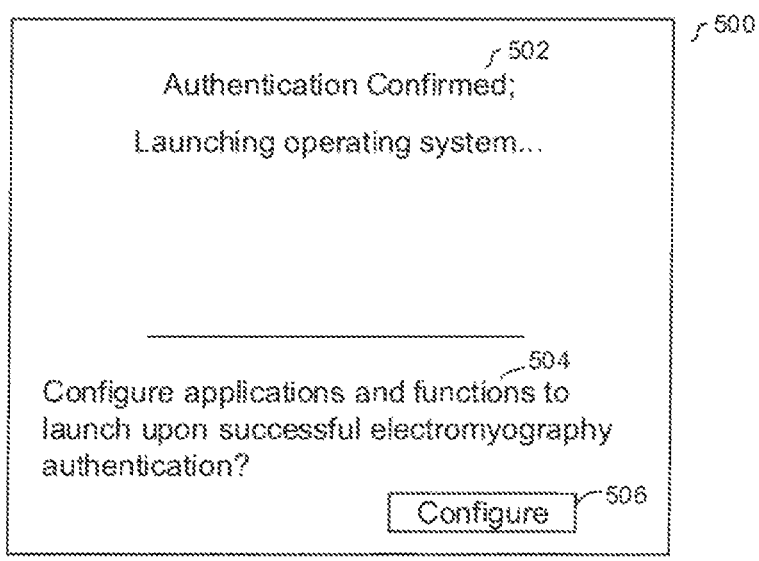

Then, responsive to successful authentication based at least on the EMG input and also in some embodiments the additional input, the UI 500 of FIG. 5 may be presented on the display. The UI 500 includes an indication 502 that authentication has been confirmed and/or successful. In some embodiments, such as the example shown in FIG. 5, the indication 502 may also indicate what is occurring responsive to the successful authentication, such as the device launching, initiating, and/or resuming execution of an (e.g. guest and/or host) operating system. Furthermore, and also in some example embodiments, the UI 500 may include a prompt 504 asking whether the user desires to configure applications and/or functions that should be launched and/or initiated upon successful authentication using EMG to identify the user in accordance with present principles. Accordingly, a selector element 506 is shown which is selectable to automatically without further user input cause another UI to be presented at the device for configuring the device to launch such applications and/or initiate such functions. Examples of such applications and/or functions for which corresponding options may be presented on the other UI for selection to thus be launched and/or initiated upon successful authentication include e.g. a word processing application, a music player application, connection to a Wi-Fi network, initiation of an electronic personal assistant, connection to a LAN server, etc.

Figure 6:
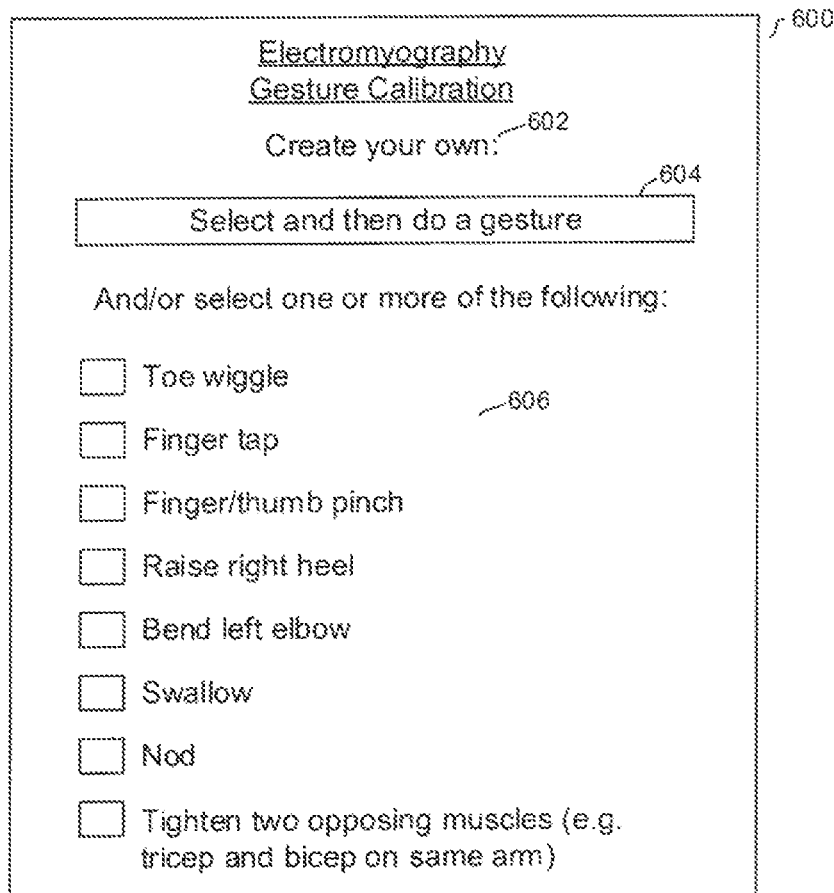

Now in reference to FIG. 6, it shows an example UI 600 presentable on the display of a device such as the system 100 and/or the device undertaking the logic of FIG. 3 in accordance with present principles to configure such a device to authenticate and/or permit access thereto based on one or more particular gestures gestured by the user as sensed by the device (e.g. using input from a camera to execute gesture recognition based on the input) and/or as sensed by e.g. another, wearable apparatus sensing the gestures using e.g. EMG and/or inertial sensors (such as an accelerometer) which provides corresponding input to the device. In any case, the UI 600 includes a first option 602 for a user to create and/or indicate a particular gesture which they desire to use. Accordingly, selector element 604 is shown, which is selectable to automatically without further user input responsive thereto begin tracking and/or detecting for a gesture to be gestured by the user. Thus, after selecting the element 604, for example, another UI may be presented indicating that it is currently the proper time for the user to gesture a gesture which will then be sensed and/or identified by the device and then have information related thereto stored (e.g. at the device) for identification of the user at a later time when again gesturing the gesture.

The UI 600 also includes one or more predefined and/or preconfigured user-selectable options 606 of gestures (e.g. based on selection of respective check boxes shown on the UI 600 for each of the options) that a user may select to thus authenticate himself or herself by gesturing a gesture corresponding to the selected option. Thus, as may be appreciated from FIG. 6, gestures for which options may be presented include a toe wiggle, a finger tap (e.g. on a surface such as a desk or the ground), a finger/thumb pinch (e.g. contacting the respective tips of an index finger and thumb of the same hand), a raise of a right heel of the user, a bend of the user's left elbow, the user swallowing and/or otherwise controlling their neck muscles to gesture a swallow, a nod of the user's head, and/or a tightening and/or flex of two opposing muscles of the user (e.g. such as a (e.g. simultaneous or sequential) respective bleep flex and tricep flex of a bicep and tricep on one of the user's arms).

Figure 7:
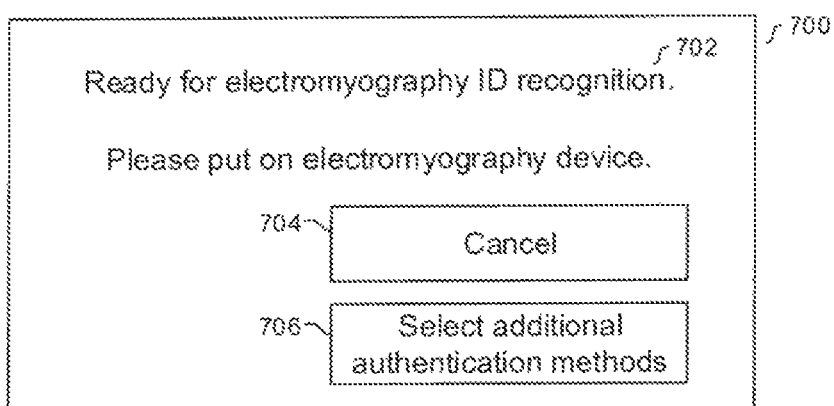

Continuing the detailed description in reference to FIG. 7, it shows an example UI 700 presentable on the display of a device such as the system 100 and/or the device undertaking the logic of FIG. 3 in accordance with present principles to configure such a device to receive input pertaining to EMG data from a (e.g. new) person for which associated data (e.g. the identifier described above in reference to FIG. 3) has yet to be stored for subsequent authentication based on input pertaining to the user's electrical signals generated based on muscle movement. Thus, the UI 700 includes a prompt 702 that the device is ready to receive input from an electromyograph for recognition of the particular user based on their unique electrical signals generated when he or she moves muscles. In some embodiments, the prompt 702 may also instruct a user to contact at least one electrode of an electromyograph (e.g. on a keyboard, on a wearable arm band, etc.).

A cancel selector element 704 is also shown on the UI 700, which is selectable to automatically without further user input cancel calibration and/or configuration of recognition of the user based on electromyograph-sensed electrical signals. Also note that a selector element 706 is shown which may be selected (e.g. before or after providing input (e.g. a muscle flex) to be sensed by the electromyograph) to automatically without further user input cause another UI to be presented from which additional authentication methods may be selected for authentication of the user. Thus, in some embodiments, selection of the element 706 causes the device to automatically without further user input present the UI 800 shown in FIG. 8.

Figures 8, 9:
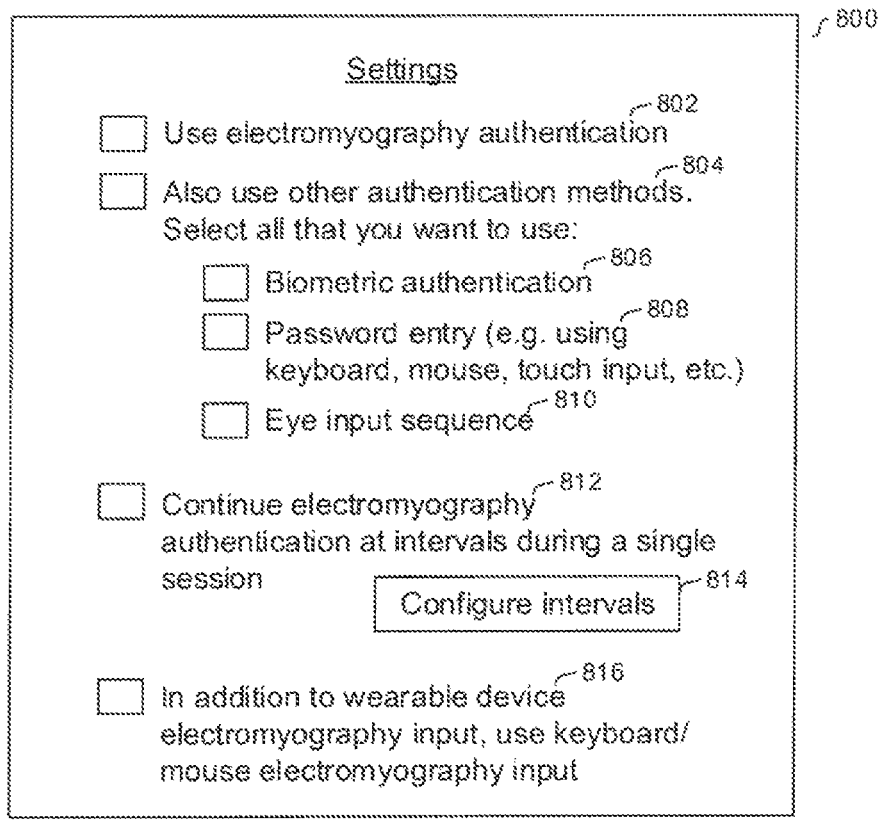
FIG. 9 is an example data table in accordance with present principles.

Accordingly, reference is now made to FIG. 8. The UI 800 shown therein is understood to be presentable on the display of a device such as the system 100 and/or the device undertaking the logic of FIG. 3 in accordance with present principles to configure settings of the device. Each of the options shown in the UI 800 and discussed below are understood to be respectively accompanied by a cheek box which when selected enables the respective option. Thus, as may be appreciated from FIG. 8, the UI 800 includes a first option 802 to enable the device to use input from an electromyograph to authenticate a user as discussed herein. The UI 800 also includes a second option 804 to enable authentication using other authentication methods (e.g. in addition to or in lieu of EMG authentication). Thus, the option 804 itself includes various sub-options which may be respectively enabled based on selection of each one's corresponding check box, including an option 806 to enable authentication based on biometric input, an option 808 to enable authentication based on password entry (e.g. using a keyboard, using a mouse, using touch-based input, and/or any combination thereof), and an option 810 to enable authentication based on an eye input sequence input by a user (e.g. a sequence already established by the user and recognizable by the device e.g. by executing eye tracking software on images of the user from a camera, such as a sequence of looking up relative to a display in which the camera is integrated, looking back to center, looking up again, then looking right).

The UI 800 also includes an option 812 to enable the device to continue EMG authentication during a single (e.g. login and/or authenticated) session after an initial EMG authentication, such as e.g. at regular and/or user-defined intervals. Thus, selector element 814 is shown on the UI 800 for the option 812, where the element 814 is selectable to automatically without further user input e.g. cause another UI and/or an entry box to be presented at which a user may enter a number and time increment (e.g. thirty seconds) to establish the interval. Nonetheless, note that the interval itself may be somewhat flexible and/or may vary by a threshold time depending on the rate of input to the electromyograph used for EMG authentication. For instance, the interval may be established to be every thirty seconds, but electrodes on a keyboard are only placed on certain keys. Thus, every thirty seconds, the device may wait for one of those keys to be pressed to thus get an EMG reading, and then upon receiving such a reading restart tracking of the interval.

Still in reference to FIG. 8, the UI 800 also includes an option 816 to enable the device to authenticate and/or otherwise use input from an electromyograph from both of a wearable device in contact with a user and a keyboard and/or mouse also bearing an electromyography such as e.g. the keyboard 216 and mouse 220 described above.

Moving on in the detailed description to FIG. 9, it shows an example data table 900 which may be used in accordance with present principles to e.g. determine whether EMG input that is received is associated with a particular EMG identifier for a particular user authorized to manipulate the device, and/or also to use such an EMG identifier to identify the name of a person associated therewith and/or permissions to be associated with the user, such as may occur at e.g.

diamond 304 of FIG. 3. Thus, the data table 900 includes a first column 902 comprising data indicating respective (e.g. unique) EMG identifiers for different people (represented in FIG. 9 as example identifiers X, Y, and Z), a second column 904 comprising data including first names of the people respectively associated with each identifier, and a third column 906 comprising data indicating respective specific permissions and/or levels of access to a device for each particular user.

As an example, should a device receive input from an electromyograph and identify the input as pertaining to a specific signal frequency in a spectrum of frequencies, the device may identify a particular EMG identifier associated with the frequency. E.g., the device may access a data table associating particular frequencies in one column with respective entries for EMG identifiers respectively associated with those frequencies in another column to thus locate an entry in the first column corresponding to the identified frequency. The device may then go to the second column for the respective entry to locate data indicating an EMG identifier for the frequency of the signal that is identified. In this example, assume the EMG identifier is identified as X.

Thus, after the device determines that the input from the electromyograph is associated with the identifier X, the logic may access the data table 900, locate the entry for identifier X in column 902, and then access data in column 906 for the entry for identifier X to determine the specific permissions and/or levels of access to the device granted to the particular user associated with identifier X. In the present example, the permissions associated with identifier X are "all" such as e.g. unrestricted access and control of the device.

Notwithstanding the foregoing, it is to be understood that an EMG identifier may be established and/or identified still other ways than what was described two paragraphs above, such as e.g. the device sensing electrical signals generated by a user's muscles and then prompting a user and/or administrator to indicate an identifier to be associated with signals of the user's unique frequency.

Without reference to any particular figure, it is to be understood that a device undertaking present principles may be a so-called all-in-one device and/or a device including both an electromyography, a display, and instructions executable by a processor to undertake present principles (e.g. such as the logic of FIG. 3). However, note that in other embodiments, a computer such as a tablet or smart phone may (e.g. wirelessly) receive in part from an electromyograph on another device (e.g. a wearable arm band) and execute such instructions based on the input received wirelessly.

Also without reference to any particular figure, it is to be understood that the input devices described herein, such as e.g. the keyboards and mice which may comprise respective electromyographs, may also comprise e.g. biometric sensors for (e.g. additional) authentication in accordance with present principles, such as e.g. fingerprint readers being juxtaposed on one or more keys of a keyboard and/or one or more buttons of a mouse to (e.g. concurrently) execute fingerprint authentication of a user along with EMG authentication of the user e.g. when logging in to the device and/or throughout a particular login session (e.g. where the biometric sensor and the electrode for the electromyographs may be on the same key).

It may now be appreciated that present principles provide for e.g. using electromyography to read and/or identify electrical signals generated when a user performs a muscle movement. These signals can be generated based on "full" gestures such as e.g. a wave of the hand. However they can also generated based on relatively smaller, and even relatively unnoticeable muscle movements, such as e.g. subtle finger movements, a wiggling a person's toes, swallowing, and/or tightening two muscle groups in opposition. Any of these movements are understood to generate an electrical signal, which is relatively unique (e.g. unique to a specific person), and which is used to authenticate the person for e.g. logging on to a system (e.g. a device), a web site, etc.

Thus, in one aspect, present principles leverage the differences in the signals from different people to make and/or create a unique identifier for the person being authenticated and/or to be authenticated after an initial calibration based on their particular signal. In some embodiments, the identifier may also be combined with a unique pattern of muscle movement (e.g. a gesture in free space) that a person can choose to also perform as part of the authentication. Also in some embodiments, the EMG authentication may be combined with other methods of authentication such as e.g. password entry using a keyboard, using eye tracking, etc.

In addition, in some embodiments EMG authentication may be performed (e.g. relatively seamlessly to the user) by reading EMG waves when the user makes contact with an electrode of an electromyograph on a particular key of an input device such as a keyboard when inputting a password (thus providing multi-tiered authentication based on the act of inputting a password and thus without any additional action). If that particular password entry is for establishing authentication credentials rather than e.g. logging in after credentials have been established for the user, a unique multifactor authentication scheme may be created by generating an EMG identifier and/or otherwise associated the user's EMG waves with the user (e.g. at the device itself). Thus, even if a correct password has been inputted to the device, the device may still deny authentication and/or login based on the EMG waves that are detected (e.g. from wrist and/or finger contacts on the keyboard) not being associated with the user with which the password is also associated.

Even further, in some embodiments, once authentication has been executed successfully based on a user's EMG waves, during the authenticated session a mouse with an electromyograph thereon may constantly and/or periodically monitor EMG waves of the user sensed at the mouse to determine whether the logged-in and/or authenticated user is still the person moving the mouse and/or otherwise controlling the device. If the device determines that the same and/or authenticated user is still controlling the device, the device may allow the session to continue. However, if the device determines based on the EMG waves that a different user is now controlling the device, the device may e.g. automatically end the session regardless of any input from the unauthenticated person to not do so, and/or the device may again request login and/or authentication (e.g. prompt the authenticated user to again touch the keyboard to provide EMG input to be authenticated for e.g. another threshold time during which the unauthenticated user may use the device with the authenticated user's permission before again being "locked out" of the device).

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a transitory signal and/or a signal per se.

While the particular AUTHENTICATION BASED ON BODY MOVEMENT is herein shown and described in detail, it is to be understood that the subject matter which is encompassed by the present application is limited only by the claims.

What is claimed is:

1. A device, comprising:
a processor; and
storage accessible to the processor and bearing instructions executable by the processor to:
receive first input from at least one electromyograph;
based at least in part on the first input, determine whether a user is authorized to manipulate the device to execute at least a first function;
in response to a determination that the user is authorized to manipulate the device to execute at least the first function, permit manipulation of the device to execute at least the first function;
subsequent to permission to manipulate the device to execute at least the first function and during a single session in which the permission is granted based at least in part on receipt of the first input, receive second input from at least one electromyograph; and
based at least in part on the second input, determine whether the second input is one or more of: associated with the user, and associated with another person authorized to manipulate the device to execute at least the first function.

2. The device of claim 1, comprising the electromyograph.

3. The device of claim 1, comprising a network interface, wherein the first input is wirelessly received from an electromyograph at least in part using the network interface.

4. The device of claim 1, wherein the instructions are executable by the processor to:
determine that the user is authorized to manipulate the device to execute at least the first function at least in part based on identification of the first input as being associated with the user.

5. The device of claim 4, wherein the first input is identified as being associated with the user based at least in part on receipt of the first input and identification of the first input as being associated with an identifier associated with the user.

6. The device of claim 5, wherein the identifier is established at the device at least in part based on third input received at the device prior to receipt of the first input, the third input being received from an electromyograph which senses electrical activity of at least one muscle.

7. The device of claim 4, wherein the device is a first device, and wherein the first input is identified as being associated with the user based at least in part on receipt of the first input and identification of the first input as being from a second device associated with the user, the second device being different from the first device.

8. The device of claim 1, wherein the instructions are executable by the processor to:
determine that the user is authorized to manipulate the device to execute at least the first function at least in part based on identification of the first input as being indicative of user performance of a particular gesture.

9. The device of claim 1, where in the instructions are executable by the processor to:
in response to a determination that the user is authorized to manipulate the device to execute at least the first function, permit use of an operating system at the device.

10. The device of claim 1, wherein the first input is received from a mouse.

11. The device of claim 1, wherein the instructions are executable to:
based at least in part on the second input, determine that the second input is not one or more of associated with the user and associated with another person authorized to manipulate the device to execute at least the first function; and
in response to the determination that the second input is not one or more of associated with the user and associated with another person authorized to manipulate the device to execute at least the first function, prevent execution of at least the first function.

12. The device of claim 1, wherein the instructions are executable to:
based at least in part on the second input, determine that the second input is not one or more of associated with the user and associated with another person authorized to manipulate the device to execute at least the first function; and
in response to the determination that the second input is not one or more of associated with the user and associated with another person authorized to manipulate the device to execute at least the first function, end the single session.

13. The device of claim 1, wherein the instructions are executable to:
based at least in part on the second input, determine that the second input is not one or more of associated with the user and associated with another person authorized to manipulate the device to execute at least the first function; and
in response to the determination that the second input is not one or more of associated with the user and associated with another person authorized to manipulate the device to execute at least the first function, request input from one or more of the user and another person authorized to manipulate the device to execute at least the first function.

14. A method, comprising:
receiving, at a device, first input from at least one electromyograph;
determining, based at least in part on the first input, whether a user is authorized to manipulate the device to execute at least a first function;
permitting, in response to determining that the user is authorized to manipulate the device to execute at least the first function, manipulation of the device to execute at least the first function;
receiving, subsequent to permission to manipulate the device to execute at least the first function and during a single session in which the permission is granted based at least in part on receipt of the first input, second input from at least one electromyograph; and
determining, based at least in part on the second input, whether the second input is one or more of: associated with the user, and associated with another person authorized to manipulate the device to execute at least the first function.

15. The method of claim 14, comprising:
determining that the user is authorized to manipulate the device to execute at least the first function at least in part based on identification of the first input as being associated with the user.

16. The method of claim 15, wherein the device is a first device, and wherein the first input is identified as being associated with the user based at least in part on receipt of the first input and identification of the first input as being from a second device associated with the user, the second device being different from the first device.

17. The method of claim 14, comprising:
determining that the user is authorized to manipulate the device to execute at least the first function at least in part based on identification of the first input as being indicative of user performance of a particular gesture.

18. A computer readable storage medium (CRMS) that is not a transitory signal, the computer readable storage medium comprising instructions executable by at least one processor to:
receive first input from at least one electromyograph;
based at least in part on the first input, determine whether a user is authorized to manipulate a device to execute at least a first function;
in response to a determination that the user is authorized to manipulate the device to execute at least the first function, permit manipulation of the device to execute at least the first function;
subsequent to permission to manipulate the device to execute at least the first function and during a single session in which the permission is granted based at least in part on receipt of the first input, receive second input from at least one electromyograph; and
based at least in part on the second input, determine whether the second input is one or more of: associated with the user, and associated with another person authorized to manipulate the device to execute at least the first function.

19. The CRSM of claim 18, wherein the device is a first device, and wherein the instructions are executable by the at least one processor to:
determine that the user is authorized to manipulate the device to execute at least the first function at least in part based on identification of the first input as being associated with the user, wherein the first input is identified as being associated with the user based at least in part on receipt of the first input and identification of the first input as being from a second device associated with the user, the second device being different from the first device.

20. The CRSM of claim 18, wherein the instructions are executable by the at least one processor to:
determine that the user is authorized to manipulate the device to execute at least the first function at least in part based on identification of the first input as being indicative of user performance of a particular gesture.

* * * * *